United States Patent Office 3,089,807
Patented May 14, 1963

3,089,807
STABLE THIOPHOSPHATE AND THIOPHOSPHITE COMPOSITION
Leo Trademan, Prairie Village, Kans., and Francis R. Yagelowich, Kansas City, Mo., assignors to Chemagro Corporation, New York, N.Y., a corporation of New York
No Drawing. Filed Aug. 30, 1961, Ser. No. 134,826
15 Claims. (Cl. 167—22)

This application is a continuation-in-part of application Serial No. 105,882, filed April 27, 1961, now abandoned.

This invention relates to a pesticidal composition including a novel mineral filler as a carrier for a thiophosphate type toxicant and thiophosphate and thiophosphite defoliants.

The mineral fillers normally employed as carriers or diluents for the thiophosphate type toxicants are active in deteriorating the toxicants when mixed therewith. Various materials have been suggested in the patent literature as stabilizers for such compositions, e.g., Trademan et al. Patent 2,927,882, Albert Patent 2,941,923, Sawyer et al. Patent 2,967,127, and Sawyer Patent 2,962,418. However, all of these compositions leave something to be desired.

It is an object of the present invention to provide an additive to mineral filled thiophosphate type toxicant formulations which will prevent deterioration of the thiophosphate ingredient during storage.

It is another object to provide such an additive which is relatively non-toxic and is not deleterious to plant life.

An additional object is to provide such additives to thiophosphate and thiophosphite defoliants.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

It has now been found that these objects can be obtained by utilizing diacetone alcohol to provide storage stability for thiophosphate type toxicants and thiophosphate and thiophosphite defoliants which have been formulated with siliceous mineral carriers.

As the carrier there can be employed kaolins such as kaolinite, dickite, nacrite, Barden clay, anauxite and halloysite, attapulgites such as fuller's earth, attapulgite and sepiolite, montmorillonite clays such as beidellite montmorillonite and bentonite, diatomaceous earths such as diatomite and kieselguhr, vermiculite, synthetic calcium silicates such as Micro-cel and Silene EF, talc, e.g. Eastern magnesium talc, etc. The preferred carrier is vermiculite.

Usually the mineral filler and diacetone alcohol are preblended and then the toxicant is blended in. The diacetone alcohol is usually employed in an amount of 5–20% by weight of the mineral carrier although it can in some instances be used in an amount of from 0.3–30% by weight of the mineral carrier. Preferably, 10–20% of the diacetone alcohol is used.

Typically a granular formulation contains 2 to 35% of the thiophosphate by weight. Dust formulations typically contain 0.25–50% of thiophosphate or thiophosphite based on the weight of the entire composition.

The thiophosphate ester toxicants have the following general formula

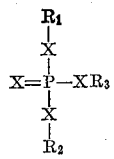

where at least one X is sulfur, at least one X is oxygen and the rest of the X's can be either oxygen or sulfur, $R_1$ and $R_2$ are aliphatic hydrocarbon radicals or halogen substituted aliphatic hydrocarbon radicals and can be alike or different and can be branched or straight chain, saturated or unsaturated or cycloaliphatic radicals. Typical radicals include methyl, ethyl, n-propyl, isopropyl, n-butyl, isobutyl, tertiary butyl, secondary butyl, n-amyl, n-hexyl, 2-ethylhexyl, n-octyl, n-decyl, n-dodecyl, oleyl, cetyl, ceryl, allyl, 2-chloroallyl, cyclohexyl, bromomethyl and 2-chloroethyl. R can be alkyl, aryl or substituted alkyl or aryl, e.g., alkylmercaptoalkyl, alkylsulfinylalkyl, alkylthioaryl, nitroaryl, etc.

The thiophosphate ester defoliants include S,S,S,-tributyl trithiophosphate (available commercially as DEF), S,S,S,-triamyl trithiophosphate, S,S,S,-tripropyl trithiophosphate, and the other thiophosphates set forth in Markley Patent 2,965,467.

The thiophosphite ester defoliants include tributyl trithiophosphite (available commercially as Folex), tripropyl trithiophosphite and triamyl trithiophosphite as well as the other thiophosphites set forth in Goyette Patent 2,955,803 as defoliants, e.g. for cotton.

The diacetone alcohol has been found to act as a deactivator for the siliceous mineral carrier so that the latter does not cause deterioration of the thiophosphate. Without the use of the diacetone alcohol the stability of the thiophosphates on the mineral filler was found to be quite poor.

Typical examples of thiophosphates which can be stabilized according to the invention are Di-Syston [O,O-diethyl-S-(ethylthio)ethyl phosphorodithioate], Systox [O,O-diethyl O (and S)-2-(ethylthio)ethyl phosphorothioates], Thimet [O,O-diethyl (S-ethylmercapto)methyl dithiophosphate], Malathion [S-(1,2-dicarboethoxyethyl) O,O-dimethyl dithiophosphate], Meta-Systox-R [O,O-dimethyl-S-2(ethylsulfinyl)ethyl phosphorothiate], Ekatin [O,O-dimethyl S-2(ethylthio) ethyl phosphorothioate], Bayer 23655 [O,O-dimethyl S-2-(ethylsulfinyl)isopropyl phosphorothioate], Bayer S-299 [O,O-dimethyl-S-2(ethylsulfinyl)ethyl phosphorodithioate], Bayer 29493 [O,O-dimethyl-O-(4-methylthio)m-tolyl phosphorothioate], Meta-Systox-I [O,O-dimethyl S-2(ethylthio)ethyl phosphorothioate], Parathion [O,O-diethyl-O-p-nitrophenyl phosphorothioate], Methyl Parathion (O,O-dimethyl-O-p-nitrophenyl phosphorothioate), S-tertiary butyl-mercaptomethyl O,O-diethyl dithiophosphate, S-secondary amyl mercaptomethyl O,O-diethyl dithiophosphate, S-n-butoxymethyl O,O-bis (2-chloroethyl) dithiophosphate, and S-tertiary butylmercaptomethyl O,O-bis (2-chloroethyl) dithiophosphate.

In the following examples the mineral fillers were of granular size (20–80 mesh). When dust formulations are employed the particle size is generally smaller than 325 mesh.

Unless otherwise indicated, all proportions are by weight.

*Example 1*

Formulations containing 5.0% Meta-Systox-R and 95.0% of various carriers were prepared and the percent Meta-Systox-R remaining was determined by infra-red analysis after various times at 50° C. with the results indicated below:

| Carrier | Percent Remaining | |
|---|---|---|
| | 2 Weeks | 4 Weeks |
| Vermiculite | 60 | 50 |
| Attaclay (an attapulgus clay) | 50 | 30 |
| Pike's Peak Clay (a montmorillonite) | 60 | 23 |

*Example 2*

Formulations containing 5.0% Meta-Systox-R, 5–20% of the indicated deactivator (or stabilizer) and 75–90% of granular Attaclay were prepared and the percent Meta-Systox-R remaining was determined by infra-red analysis after various times at 50° C. with the results indicated below. As the amount of deactivator was increased in the example the amount of mineral filler, Attaclay, was correspondingly decreased.

| Deactivator | Percent Concentration | Percent Remaining | |
|---|---|---|---|
| | | 2 Weeks | 4 Weeks |
| Ethylene glycol | 5 | 85 | 52 |
| Do | 10 | 77 | 43 |
| Do | 15 | 51 | 34 |
| Do | 20 | 64 | 44 |
| Diacetone alcohol | 5 | 80 | 60 |
| Do | 10 | 65 | 55 |
| Do | 15 | 92 | 62 |
| Do | 20 | 94 | 65 |

It will be observed that diacetone alcohol was superior to ethylene glycol as a stabilizer at the higher concentrations after two weeks and was superior at all concentrations after four weeks.

*Example 3*

Example 2 was repeated replacing the Attaclay by granular Pike's Peak Clay with the following results:

| Deactivator | Percent Concentration | Percent Remaining | |
|---|---|---|---|
| | | 2 Weeks | 4 Weeks |
| Diacetone alcohol | 10 | 62 | 31 |
| Do | 15 | 70 | 53 |
| Do | 20 | 80 | 65 |
| Ethylene glycol | 10 | 90 | 71 |
| Do | 15 | 93 | 77 |
| Do | 20 | 80 | 50 |

Utilizing Pike's Peak Clay the diacetone alcohol was as good as ethylene glycol at 20% concentrations at 2 weeks and better at 4 weeks but was not as good at 10 and 15% concentrations.

*Example 4*

Example 2 was repeated replacing the Attaclay by granular vermiculite with the following results:

| Deactivator | Percent Concentration | Percent Remaining | | | |
|---|---|---|---|---|---|
| | | 2 Wks. | 4 Wks. | 6 Wks. | 12 Wks. |
| Ethylene glycol | 5 | 64 | 32 | | |
| Do | 10 | 66 | 27 | | |
| Do | 15 | 74 | 27 | | |
| Do | 20 | 88 | 36 | | |
| Diacetone alcohol | 5 | 70 | 44 | 22 | 0 |
| Do | 10 | 80 | 77 | 52 | 30 |
| Do | 15 | 90 | 85 | 70 | 49 |
| Do | 20 | 93 | 87 | 88 | 55 |

It will be observed that the diacetone alcohol was much superior to the ethylene glycol at all concentrations at two weeks and also at four weeks. In fact, good stability of the Meta-Systox-R was shown even after 12 weeks heating at 50° C. at 15 and 20% concentrations.

*Example 5*

Formulations containing 5% of the indicated phosphate ester, 20% diacetone alcohol and 75% granular vermiculite were prepared and the percent phosphate ester remaining after various times at 50° C. were determined as indicated below:

| Phosphate | Percent Remaining | | | |
|---|---|---|---|---|
| | 2 Weeks | 4 Weeks | 6 Weeks | 12 Weeks |
| Bayer S-299 | 100 | 78 | 76 | |
| Bayer 23655 | 99 | 98 | 90 | |
| Meta-Systox-I | 82 | 65 | 56 | |
| Meta Systox-R | 93 | 87 | 88 | |
| Ekatin S-275 | 84 | 73 | 63 | |
| Meta-Systox-R (Repeat) | 100 | 93 | 92 | 55 |

*Example 6*

Example 5 was repeated replacing the vermiculite by granular Pike's Peak Clay with the following results:

| Phosphate | Percent Remaining | |
|---|---|---|
| | 2 Weeks | 4 Weeks |
| Bayer S-299 | 72 | 36 |
| Bayer 23655 | 70 | 66 |
| Meta-Systox-I | 50 | 0 |
| Meta-Systox-R | 60 | 23 |
| Ekatin S-275 | 16 | 3 |

Improvement in stability was also obtained when diacetone alcohol was used with Attaclay, Barden clay and celite (diatomaceous earth) with these thiophosphates.

*Example 7*

Formulations containing 5% of Bayer 29493, the indicated percentages of diacetone alcohol and the balance the indicated granular mineral filler were prepared and the percent Bayer 29493 lost was determined by infra-red analysis after various times at 50° C. with the results indicated below. (An error of up to about 5% in the amount of Bayer 29493 present can result due to the method of analysis.)

| Filler | Percent Diacetone Alcohol | Percent Loss | | | |
|---|---|---|---|---|---|
| | | 2 Weeks | 4 Weeks | 6 Weeks | 8 Weeks |
| Attaclay | 0 | 48.5 | 54.0 | 60 | |
| Do | 5 | 6.3 | 18.7 | 31.0 | |
| Do | 10 | 9 | 16.0 | 35.0 | |
| Pike's Peak Clay | 0 | 26.9 | 32.0 | 32.0 | |
| Do | 5 | 18.0 | 45.0 | 45.0 | |
| Do | 10 | 0 | 0 | 0 | 13.0 |
| Vermiculite | 0 | 50.0 | 53.0 | | |
| Do | 5 | 19 | 20 | 21 | 22 |
| Do | 10 | 5 | 6 | 0 | 0 |

*Example 8*

Example 7 was repeated replacing the Bayer 29493 by 5% methyl parathion in the formulations.

| Filler | Percent Diacetone Alcohol | Percent Loss | | | |
|---|---|---|---|---|---|
| | | 3 Weeks | 5 Weeks | 7 Weeks | 9 Weeks |
| Vermiculite | 0 | 0 | 3.7 | 7.5 | |
| Do | 10 | 0 | 0 | 0 | |
| Attaclay | 0 | 12 | 12 | 7 | |
| Do | 10 | 0.4 | 0.5 | 0.0 | |
| Pike's Peak Clay | 0 | 9 | 0 | | 32 |
| Do | 10 | 0.4 | 0.4 | | 1.1 |

The solid carriers can be blended with the diacetone alcohol in the present invention by any known means.

For example, the use of commercial type mixers or blenders is adequate. While preferably the diacetone alcohol is added to the carrier prior to to adding the phosphate ester, it is also within the scope of the invention to add the diacetone alcohol to the carrier during the same blending operation wherein mixing of the phosphate ester and carrier is achieved.

*Example 9*

Example 7 was repeated replacing the Bayer 29493 by 10% di-Syston in the granular formulations.

| Filler | Percent Diacetone Alcohol | Percent Remaining | |
|---|---|---|---|
| | | 2 Weeks | 4 Weeks |
| Attaclay | 0 | 88 | 83 |
| Do | 7 | 100 | 100 |
| Pike's Peak Clay | 0 | 90 | 90 |
| Do | 7 | 100 | 100 |

*Example 10*

Formulations containing 25% S,S,S-tributyl trithiophosphate (DEF), the indicated percentages of diacetone alcohol and the balance Attaclay were made up as dusts with the results indicated.

| Percent Diacetone Alcohol | Percent Loss After Room Temperature | 8 Weeks, 50° C. |
|---|---|---|
| 0 | 4 | 11 |
| 3 | 0.12 | 5 |
| 5 | 0.00 | 0.4 |

Similar results can be obtained by replacing the DEF by Folex in Example 10.

What is claimed is:

1. A composition comprising discrete particles of a siliceous mineral, a member of the group consisting of S,S,S-trialkyl trithiophosphates having 3 to 5 carbon atoms in the alkyl groups, trialkyl trithiophosphites having 3 to 5 carbon atoms in the alkyl groups, [O,O-diethyl-S-(ethylthio) ethyl phosphorodithioate], O,O-dimethyl-S-2-(ethylsulfinyl)ethyl phosphorothioate, O,O - dimethyl - O - (4-methylthio)m-tolyl phosphorothioate, and [O,O-dimethyl-S-2-(ethylsulfinyl)isopropyl phosphorothioate] and diacetone alcohol as a stabilizer.

2. A composition according to claim 1 wherein the diacetone alcohol is present in an amount of 10–20%.

3. A composition according to claim 1 wherein the siliceous mineral is vermiculite.

4. A composition according to claim 3 wherein the diacetone alcohol is present in an amount of 10–20%.

5. A pesticidal composition according to claim 1 wherein the siliceous carrier is selected from the group consisting of kaolin clay, montmorillonite clay, attapulgite clay, diatomaceous earth, clay and vermiculite.

6. A composition according to claim 5 wherein the thiophosphate ester is methyl parathion.

7. A composition according to claim 5 wherein the thiophosphate ester is O,O-dimethyl O-(4-methylthio)m-tolyl phosphorothioate and the carrier is vermiculite.

8. A composition according to claim 5 wherein the thiophosphate ester is O,O-diethyl-S-(ethylthio)ethyl phosphorodithioate.

9. A composition according to claim 5 wherein said thiophosphate ester is O,O-dimethyl S-2(ethylsulfinyl) ethyl phosphorothioate.

10. A composition according to claim 9 wherein the carrier is vermiculite.

11. A composition according to claim 10 wherein the diacetone alcohol is present in an amount of 10–20%.

12. A composition according to claim 1 wherein the thiophosphate is S,S,S-tributyl trithiophosphate.

13. A composition according to claim 12 wherein the diacetone alcohol is used in an amount of 5–20%.

14. A composition according to claim 13 wherein the siliceous mineral is clay.

15. A composition comprising discrete particles of a siliceous mineral, S,S,S-tributyl trithiophosphite and diacetone alcohol as a stabilizer.

References Cited in the file of this patent

UNITED STATES PATENTS

| | | |
|---|---|---|
| 2,875,121 | Trademan et al. | Feb. 24, 1959 |
| 2,941,923 | Albert | June 21, 1960 |
| 2,962,418 | Sawyer | Nov. 29, 1960 |
| 2,970,080 | Oros et al. | Jan. 31, 1961 |